Oct. 5, 1954  D. S. POOLE  2,690,985
BELT
Filed June 2, 1951
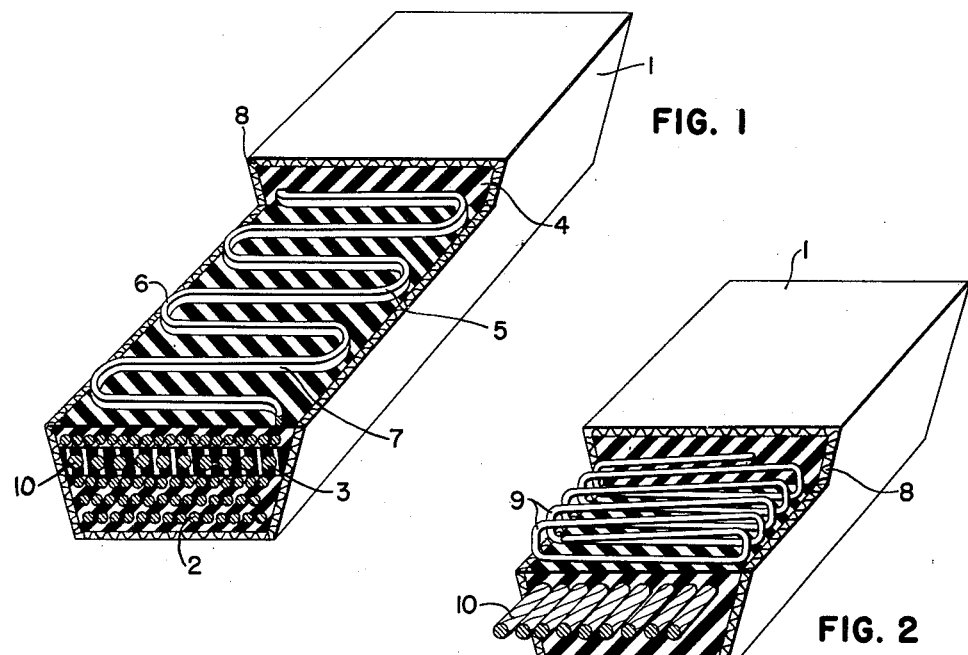
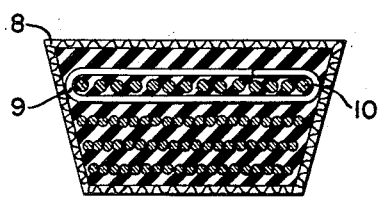
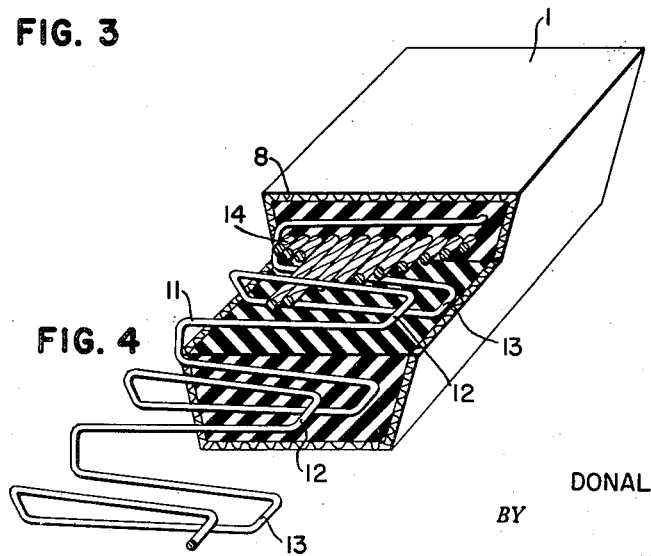
INVENTOR.
DONALD S. POOLE
BY
R. L. Miller
ATTORNEY Patented Oct. 5, 1954

2,690,985

UNITED STATES PATENT OFFICE 2,690,985

BELT

Donald S. Poole, Akron, Ohio, assignor, by mesne assignments, to The Goodyear Tire & Rubber Company, a corporation of Ohio Application June 2, 1951, Serial No. 229,591

5 Claims. (Cl. 154—52.2)

This invention relates to belts and more particularly to an improved belt of the side-driving type.

The improved belt of this invention is particularly adapted for use in variable-speed driving units which require a belt of substantial width and relatively small thickness. A belt of this type made according to the usual practices has a tendency to buckle, which materially shortens the life of the belt and reduces the effectiveness of the drive. It is therefore a particular object of this invention to provide a belt that is rigid transversely but flexible longitudinally.

Another object of the invention is to provide a belt that is easily fabricated and economical in cost.

A still further object is to provide a belt that is transversely rigid but will satisfactorily withstand the continual longitudinal flexing in service.

Another object is to provide a belt construction that will not require special mold equipment to vulcanize.

Other objects and advantages of this invention will become apparent hereinafter as the description thereof proceeds, the novel features, arrangements and combinations being clearly pointed out in the specification, as well as in the claims thereunto appended.

In the drawings:

Fig. 1 is a perspective view, partially in section, of one form of the invention;

Fig. 2 is a perspective view, partially in section, of another form of the invention;

Fig. 3 is a cross-section of a modification of the form of the invention shown in Fig. 2; and Fig. 4 is a perspective view, partially in section, of a still further form of the invention.

Belts are being used more and more for power transmission and consequently many different types of service conditions are encountered. Variable speed transmission systems, particularly, require a wide V-type belt of relatively thin cross-section in order to provide the necessary range of speeds and consequently, belts of this type are not supported by the pulleys to the same extent as a conventional type of V-belt. The usual variable speed transmission comprises a pair of variable pitch diameter pulleys or sheaves over which the belt runs and a change in the pitch diameter of one pulley automatically changes the pitch diameter of the other so that a constant pitch length is maintained between the pulleys. Necessarily, a substantial lateral pressure is always exerted by the pulleys on the sides of the belt in order to maintain an adequate driving force on the belt at any position of the pulleys. The lateral pressure will cause the belt to buckle if the belt is not sufficiently rigid in the lateral direction, but at the same time the belt must be flexible longitudinally so that it can pass around the pulleys at the small diameters.

Many attempts have been made to produce belts to meet the above conditions but for the most part the results have been unsatisfactory. Probably the greatest cause of belt failure occurs because the various component parts of the belt structure separate under the continual flexing of the belt. This invention overcomes these difficulties by providing a novel belt structure, as will be apparent in the following detailed description.

In Fig. 1, a belt 1 is made up of a compression section 2, a neutral axis section 3, a tension section 4, and, in addition, a transverse stiffening member 5 between the neutral axis section 3 and the tension section 4. The transverse stiffening member 5 as illustrated is a sinuous-shaped wire 6 of rectangular cross-section, although other cross-sectional shapes may be used if desired. Preferably the portions 7 of the wire 6 should extend substantially transversely of the belt through a substantial portion of the width of the belt 1. The stiffening member 5 is treated to cause the adjacent layers of the belt structure to adhere to the member 5. Any of the well-known means in the art such as brass-plating, cementing, etc. may be used to accomplish this result.

The compression section 2 is shown as several layers of rubber-coated fabric and the neutral axis section 3 is shown as a series of longitudinally extending parallel cords embedded in a rubber layer with a solid rubber tension section 4 located above the neutral axis section 3. The tension section 4 may be made if desired of a relatively hard rubber to further stiffen the belt in the transverse direction. This particular construction is used only for the purpose of illustration as the transverse stiffening member may be used in combination with other types of belt construction without departing from the scope of the invention. As shown the structure is then enclosed in an envelope 8 in the usual manner and vulcanized in accordance with the practices well known in the art to produce an integral structure.

In Figs. 2 and 3 the transverse stiffening member 9 is a wire in the shape of a flattened coil with the longer axis of the coil extending generally transversely of the belt. In Fig. 2 the stiffening member 9 is above the longitudinally extending cords 10 of the neutral axis section. In Fig. 3 the cords 10 of the neutral axis section extend longitudinally of the belt and interiorly of the transverse stiffening member 9.

In Fig. 4 a still further modification is shown in which the transverse stiffening member 11 is a sinuous-shaped wire of circular cross-section extending back and forth transversely throughout substantially the entire width of the belt but adjacent loops, such for example as 12 and 13 of the member 11, are in different planes. The cord members 14 of the neutral axis sections extend longitudinally of the belt and interleaved between the transverse loops of the reinforcing member 11.

The transverse stiffening element in all modifications has been illustrated as a continuous element but it is to be understood that if found desirable a series of individual units may be used to make up this member. The transverse stiffening member may be formed from any material that is substantially incompressible in the direction of its length and of any desired cross-sectional shape. Preferably the transverse stiffening member should be completely embedded in rubber in order that the member can flex longitudinally without relative movement between the stiffening member and adjacent portions of the belt. As is readily apparent from the preceding description, the belts will be very rigid transversely and at the same time very flexible longitudinally as the transverse stiffening member will not interfere with the longitudinal flexing of the belt.

While certain representative embodiments and details have been shown for the purpose of illustrating the invention, it will be apparent to those skilled in this art that various changes and modifications may be made therein without departing from the spirit or scope of the invention.

I claim:

1. A single V-belt of the side-driving type including a substantially inextensible neutral axis section, a compression section below said neutral axis section, a tension section above said neutral axis section, and a transverse stiffening member extending throughout the length of the belt, said stiffening member comprising a relatively stiff wire extending sinuously back and forth across a major portion of the transverse width of the belt in the portions thereof immediately adjacent the neutral axis section with each of the transversely extending portions of the stiffening member lying in a plane substantially parallel to the neutral axis section, being spaced from adjacent transverse portions and being rigid transversely of the belt.

2. A belt as claimed in claim 1 in which the stiffening member lies in the tension section of the belt.

3. A belt as claimed in claim 1 in which different portions of the transversely extending portions of the stiffening member extend above and below the neutral axis section.

4. A belt as claimed in claim 1 in which the stiffening member is in the form of a flattened coil with the larger axis of the loops of the coil extending substantially transversely of the belt.

5. A belt as claimed in claim 4 in which the neutral axis section of the belt is interiorly of the loops of the coil.

References Cited in the file of this patent

UNITED STATES PATENTS

| Number | Name | Date |
| --- | --- | --- |
| 77,847 | Snover | May 12, 1868 |
| 1,192,362 | Young | July 25, 1916 |
| 2,167,942 | Freedlander | Aug. 1, 1939 |
| 2,263,960 | Wilson | Nov. 25, 1941 |
| 2,430,024 | Luaces et al. | Nov. 4, 1947 |
| 2,444,007 | Davis | June 22, 1948 |

FOREIGN PATENTS

| Number | Country | Date |
| --- | --- | --- |
| 173,092 | Germany | Aug. 2, 1906 |